Nov. 24, 1953  J. V. V. ELSWORTH  2,660,481
PRESSURE COMPENSATED CIRCUIT FAILURE PROTECTION DEVICE
Filed March 28, 1952
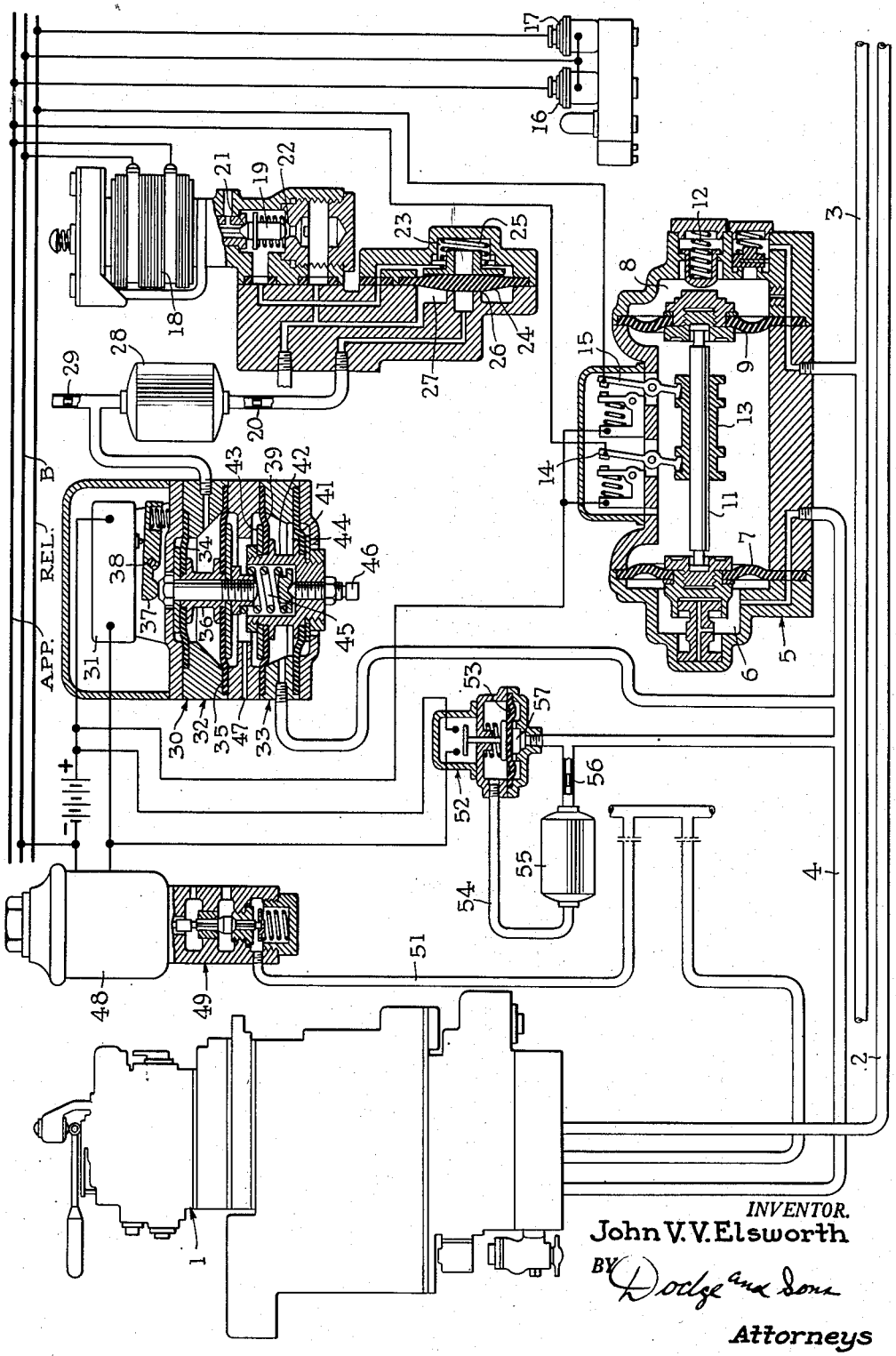
INVENTOR.
John V. V. Elsworth
BY Dodge and Sons
Attorneys Patented Nov. 24, 1953

2,660,481

UNITED STATES PATENT OFFICE 2,660,481

PRESSURE COMPENSATED CIRCUIT FAILURE PROTECTION DEVICE

John Van Varick Elsworth, Watertown, N. Y., assignor to The New York Air Brake Company, a corporation of New Jersey Application March 28, 1952, Serial No. 279,106

2 Claims. (Cl. 303—26)

This invention relates to safety devices for fluid pressure braking systems of the electro-pneumatic type. Specifically it relates to an improvement of the circuit failure protection device described and claimed in applicant's Patent Number 2,527,920 dated October 31, 1950.

It will be described as it is embodied in the 24 RL brake equipment which is a standard commercial brake.

Basically the 24 RL equipment includes two complete brake systems, one of which operates on the automatic principle and the other on the electro-pneumatic straight-air principle. These two systems exist side by side throughout the train, and selection between them may be made by manipulation of a two position cock located at the head of the train. The automatic brake system is controlled in response to variations of the pressure in a normally charged brake pipe. The electro-pneumatic system is controlled by the pressure in a normally vented straight-air pipe. The pressure in the straight-air pipe is controlled by individual application and release magnet valves carried on each car. The operation of these magnet valves is controlled by a single master controller located at the head end of the train.

The master controller moves in response to pressure variations in the so-called control pipe. It has a follow up mechanism responsive to the development of straight-air pipe pressure which moves the master controller to a position in which the application magnet valves are closed, and charging of the straight-air pipe suspended.

The pressure in the brake pipe or in the control pipe is controlled by the manipulation of an engineer's brake valve selectively depending upon the setting of the two-position cock.

It should be remarked that the brake pipe is charged whether the system is being operated on the straight-air or automatic principle. Hence a break-in two will inevitably cause an automatic energy application of the brakes. Also the engineer's brake valve when in emergency position initiates an automatic emergency application by venting the brake pipe. This is true regardless of the setting of the two-position cock.

The straight-air pipe is made up of a plurality of car-length sections which communicate with each other through a chock. This means that, even though the straight-air pipe extends the length of the train, each car is semi-isolated. If the magnet valves on a single car fail to function, the brakes on this car will not operate normally. As it is impracticable to operate the electrical portion of the electro-pneumatic system on a "fail-safe" basis, it is desirable that some means of indicating malfunctioning of the system to the engineer be provided.

Applicant pointed out in his earlier patent that leakage from the straight-air pipe, when charged, caused the master controller to cycle, i. e. to move repeatedly between application and "lap" position. Applicant conceived a device which was actuated by this cyclic operation of the master controller to cause an automatic brake application if the frequency of the cycles became too high. The operation of this device has proven satisfactory in use both on the railroads and on the test racks. The present invention is directed to improving the uniformity with which this basic device operates whereby a narrower range of demarcation between a safe and an unsafe system may be attained.

The frequency with which the master controller cycles depends upon two variables; the size of the leak from the straight-air pipe and the pressure head in the straight-air pipe. The frequency of the master controller's cycling for any given size of leak increases as the force with which brakes are applied is increased.

According to applicant's earlier patent the master controller, each time it is moved to application position, energizes the winding of a magnet valve causing this valve to open. The magnet valve controls charging flow to a reservoir which is constantly vented at a restricted rate. A pressure actuated switch is arranged to be opened in response to the accumulation of pressure fluid in this reservoir above a predetermined value and by its opening initiates an automatic brake application. The charging of this reservoir is dependent upon the frequency with which the master controller cycles.

According to the present invention the setting of the pressure actuated switch is varied in response to the control pipe pressure. This setting is varied so that the pressure required to open the switch is a direct function of control pipe pressure. Since straight-air pipe pressure corresponds to control pipe pressure, it will be seen that the operation of the safety device is compensated so that the safety control is indifferent in its response to variations in the cycling rate of the master controller which are caused by variations of the pressure head in the straight-air pipe.

The invention will be described having reference to the accompanying drawing which is a diagram of the invention as applied to the 24 RL equipment. This 24 RL equipment is not shown in its entirety. Certain parts, the operation of which is not of present interest, have been omitted for the sake of clarity.

The equipment includes an engineer's brake valve shown in elevation at 1. This valve is convertible for operation on either the automatic or straight-air principle. When operated to control the automatic brake system, its manipulation controls the pressure in the normally charged brake pipe 2. During operation of the equipment as an electro-pneumatic straight-air brake, manipulation of the engineer's brake valve 1 controls the pressure in a normally vented straight-air pipe 3. This control of straight-air pipe pressure is performed indirectly by charging or venting a normally vented control pipe 4. The pressure head in the control pipe 4 actuates a motor operated master controller 5 which in turn controls an electric circuit which will be described.

The master controller 5 has a motor space 6 to the left of the diaphragm 7 which communicates with the control pipe 4, and a second motor space 8 to the right of diaphragm 9 which is in communication with the straight-air pipe 3. The diaphragms 7 and 9 are connected together by a rod 11, and are urged to the left by a coil compression spring 12. Rod 11 carries a collar 13, the motion of which controls application and release switches 14 and 15 respectively.

The charging and venting of the straight-air pipe 3 is controlled by application and release magnet valves which appear at 16 and 17 respectively. The magnet valve windings and the switches 14 and 15 are part of a three wire control circuit. This circuit extends throughout the train, and it will be understood that each car is equipped with application and release magnet valves. The energization of these magnet valves is controlled by the master controller 5. The three wire circuit includes a source of electro-potential, typified by a battery in the drawing, a B wire, indicated by the legend B, an application wire, designated "APP" in the drawing, and a release wire designated "REL" in the drawing.

When the control pipe 4 is initially charged the diaphragm 7 of the master controller flexes to the right against the bias of spring 12. This motion closes the release switch 15 and the application switch 14 in that order. Closure of release switch 15 causes the magnet valve 17 to be energized and closes the valve against exhaust flow from the straight-air pipe 3. Closure of the application switch 14 energizes the magnet valve 16 and opens the application valve to admit pressure fluid to the straight-air pipe 3. The pressure developed in the straight-air pipe 3 reacts on the diaphragm 9 and when straight-air pipe pressure becomes approximately equal to control pipe pressure, returns the master controller 5 to "lap" position in which the release switch 15 remains closed, but the application switch 14 opens thus suspending charging flow to the straight-air pipe 3. The master controller 5 returns to normal or running position when the control pipe 4 is vented by manipulation of the engineer's brake valve 1.

Connected across the application and B wires is a winding 18. This winding controls a double-beat valve 19. The valve 19 is biased against an exhaust seat 21 and away from inlet seat 22. Valve 19 controls the flow of pressure fluid from a source, such as the main reservoir, to chamber 23 behind a diaphragm valve 24. Diaphragm valve 24 is biased by a spring 25 against an annular valve seat 26. The diaphragm valve 24 controls flow from the main reservoir through the annular chamber 27 to the accumulator volume or reservoir 28 through a choke 20. The reservoir 28 is constantly vented at a restricted rate through a choke 29.

The reservoir 28 is in free communication with one of the motor spaces of a motor operated switch 30. This switch includes a conventional micro-switch 31 and a pair of opposed motors 32 and 33. The motor 32 includes a pair of diaphragms 34 and 35 of different areas clamped at their peripheries by the sectional housing. These diaphragms are connected together at their centers by a push rod assembly 36. This assembly 36 engages a rock lever 37 which is pivoted on a pin 38. Lever 37 is spring biased against push rod 36 and actuates the micro-switch 31.

Compensating motor 33, constructed similarly to motor 32, includes two diaphragms 39 and 41 of different areas. The diaphragms 39 and 41 are connected together by a flanged spacer member 42 and follower plates 43 and 44. A coil spring 45 reacts between the thrust rod assembly 36 and spacer member 42. The initial load on the spring 45 is determined by the setting of the adjusting screw 46. The space between the motors is vented to atmosphere at 47. The working space of motor 32 is connected to the reservoir 28, and that of motor 33 is connected to the control pipe 4.

The micro-switch 31 is normally closed and is connected in series with the battery and the winding 48 of magnet valve 49. Magnet valve 49 controls exhaust flow from pipe 51 and when energized this valve remains closed. This pipe 51 is known in the industry as the "number 10 pipe." So far as is here material, venting of the pipe 51 causes an automatic service application of the brakes. The word "automatic" is used here in its technical sense to denote a brake application produced by the automatic side of the system.

In order that straight-air pipe pressure may develop normally, operation of the safety device should be suspended during the initial stages of a brake application. The pressure operated switch 52 is provided for this purpose. Switch 52 is operated by a motor which comprises a diaphragm 53 which is spring biased in a switch opening direction. The working spaces on each side of diaphragm 53 are in communication through a connection 54 which includes a reservoir 55. Flow to this reservoir is controlled by a choke 56. The working space 57 below the diaphragm 53 is connected to the control pipe 4. Closure of the switch 52 maintains the winding 48 energized regardless of the action of the switch 31 which is short circuited by switch 52.

The operation will be described with the equipment operated as an electro-pneumatic straight-air brake.

The equipment is shown in the drawing with the parts in the positions they assume when the brakes are released. Under these conditions the brake pipe 2 is fully charged, and the control pipe 4 and straight-air pipe 3 are vented. A brake application is initiated by charging the control pipe 4. This causes the switch 52 to close and the diaphragm 7 to flex to the right closing the application and release switches. Switch 52 remains closed to assure maintained closure of the magnet valve 49 for a time sufficient to charge the reservoir 55 to a value such that the spring may bias the motor to its normal position and open switch 52. Closure of the application and release switches energizes the magnet valves 16 and 17, so that charging of the straight-air pipe 3 commences. The pressure developed in the straight-air pipe acts on diaphragm 9 of the master controller to move the rod 11 to the left to "lap" position. In "lap" position the release magnet valve 17 remains energized and therefore closed and the application magnet is de-energized and charging flow to the straight-air pipe 3 is terminated.

Should there be an open release magnet valve or other leakage from the straight-air pipe 3, the master controller will again move to application position. It will remain in this position until the pressure is restored in the straight-air pipe 3 at which time the master controller 5 assumes "lap" position. The winding 18 is energized whenever the master controller 5 is in application position. Energization of the winding 18 shifts the valve 19 against inlet seat 22 and away from exhaust seat 21. Thus the space 23 is vented and diaphragm valve 24 moves from its seat 26 and admits fluid to the reservoir 28 from the main reservoir.

The volume 28 is vented at a restricted rate and the accumulation of pressure therein depends upon the frequency with which the master controller cycles or moves back and forth between application and "lap" positions.

Pressure fluid is admitted from the control pipe 4 to the pressure motor 33. Since the diaphragm 39 is larger than diaphragm 41, the pressure in motor 33 creates an upward bias on the spring 45 which is transmitted to the thrust rod assembly of the motor 32. The motor 32 is urged downward in opposition to this bias by the pressure existing in the volume 28. The effective areas of the motors 32 and 33, i. e. the difference in the area of the diaphragms, are unequal. A predetermined difference between the force exerted by each motor must exist before switch 31 will open, but the pressure differential required is not constant because of the unequal effective areas. By changing the effective areas of the two motors the relation between control pipe pressure and the pressure in volume 28 necessary to open the switch 31 can be controlled to meet any given requirements. The requirements which must be met depend upon what is considered to be a maximum tolerable amount of leakage from the straight-air pipe. No standard maximum tolerable leakage has been established and therefore the standard which is adopted is a matter of choice which rests with the individual railroad. For this reason the ability to vary the effective areas of the opposing motors is necessary. It is also necessary during initial calibration of the device because the devices cannot be made identical with one another. The effect of the compensating motor 33 is such that as control pipe pressure rises an increased pressure in volume 28 is required to operate the switch 31. This increased pressure can be controlled so that increases in the frequency with which the master controller cycles which are due only to the increased pressure head in the straight-air pipe do not cause an undesired automatic brake application.

It will be apparent to anyone skilled in the art that motors 32 and 33 could be constructed in any conventional manner. The illustrated construction is preferred because the use of two diaphragms in each motor permits the construction of a diaphragm motor which will respond to a relatively small force without the difficulties which would be attendant in such a motor if a small diaphragm were used.

It should also be remarked that once the winding 48 has been energized and the pipe 51 vented to produce an automatic application, it is necessary for the engineer to change over to automatic operation of the system in order to release the brakes. This means that the engineer is enabled to proceed without finding the trouble with the electro-pneumatic system and yet keep control of the train through the use of the automatic braking equipment.

What is claimed:

1. The combination of an electro-pneumatic brake system comprising a straight-air pipe; a pneumatically actuated master controller arranged to control pressure in said straight-air pipe and having pneumatically actuated follow up means responsive to resulting changes in straight-air pipe pressure; a control pipe for communicating controlling pressure to said master controller; a reservoir having an inlet and a constantly open restricted vent; electrically controlled valve means energized by said master controller during the development of pressure in the straight-air pipe and effective when energized to admit fluid under pressure to said inlet; first motor means actuated by pressure accumulated in said reservoir; second motor means actuated by pressure in said control pipe and acting in opposition to said first motor; brake applying means independent of said straight-air pipe and means actuated by movements of said motors in response to a resultant force exerted by said motors in excess of a predetermined value and serving when actuated to operate said brake applying means.

2. The combination defined in claim 1 including a loading spring reacting between said motors and means to vary the loading of said spring.

JOHN VAN VARICK ELSWORTH.

References Cited in the file of this patent

UNITED STATES PATENTS

| Number | Name | Date |
| --- | --- | --- |
| 2,148,725 | Borde | Feb. 28, 1939 |
| 2,160,208 | McNeal | May 30, 1939 |
| 2,173,928 | Borde et al. | Sept. 26, 1939 |
| 2,527,920 | Elsworth | Oct. 31, 1950 |